United States Patent
Tokuno et al.

(10) Patent No.: US 9,634,310 B2
(45) Date of Patent: Apr. 25, 2017

(54) SECONDARY BATTERY

(71) Applicant: KABUSHIKI KAISHA TOSHIBA, Minato-ku (JP)

(72) Inventors: Yoko Tokuno, Tokyo (JP); Naoya Hayamizu, Yokohama (JP); Ikuo Uematsu, Yokohama (JP); Tomomichi Naka, Chigasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 154 days.

(21) Appl. No.: 14/202,141

(22) Filed: Mar. 10, 2014

(65) Prior Publication Data
US 2015/0093637 A1   Apr. 2, 2015

(30) Foreign Application Priority Data
Sep. 30, 2013  (JP) .................. 2013-205792

(51) Int. Cl.
*H01M 2/16* (2006.01)
*H01M 2/14* (2006.01)

(52) U.S. Cl.
CPC ......... *H01M 2/1673* (2013.01); *H01M 2/145* (2013.01); *H01M 2/164* (2013.01); *Y02P 70/54* (2015.11)

(58) Field of Classification Search
CPC ......... H01M 2/1673; H01M 2004/021; H01M 2004/025; H01M 4/00; H01M 2/145; H01M 2/164
USPC .......................................... 429/211
See application file for complete search history.

(56) References Cited

U.S. PATENT DOCUMENTS

| | | | |
|---|---|---|---|
| 2004/0053123 A1* | 3/2004 | Chang | H01M 2/1673 429/144 |
| 2005/0266305 A1 | 12/2005 | Ohata et al. | |
| 2006/0257726 A1* | 11/2006 | Kelley | H01M 2/18 429/142 |
| 2007/0048613 A1* | 3/2007 | Yanagida | H01M 4/66 429/245 |

(Continued)

FOREIGN PATENT DOCUMENTS

| | | |
|---|---|---|
| CN | 1513215 A | 7/2004 |
| CN | 101809801 | 8/2010 |

(Continued)

OTHER PUBLICATIONS

Extended European Search Report issued Feb. 5, 2015 in Patent Application No. 14158616.4.

(Continued)

*Primary Examiner* — James Lee
(74) *Attorney, Agent, or Firm* — Oblon, McClelland, Maier & Neustadt, L.L.P.

(57) ABSTRACT

According to one embodiment, there is provided a secondary battery. This secondary battery includes an electrode and an organic-fiber layer. The electrode includes a current collector including an edge part, an active material-containing layer including an end part supported on the edge part, and a current-collecting tab including a surface a part of which is adjacent to the edge part. The organic-fiber layer is bonded with the end part of the active material-containing layer with maximum thickness and with the part of the surface of the current-collecting tab.

8 Claims, 3 Drawing Sheets

(56) References Cited

U.S. PATENT DOCUMENTS

| | | | |
|---|---|---|---|
| 2007/0059592 A1* | 3/2007 | Takami et al. | 429/161 |
| 2007/0059605 A1* | 3/2007 | Nakamura et al. | 429/246 |
| 2009/0087728 A1 | 4/2009 | Less et al. | |
| 2009/0155678 A1 | 6/2009 | Less et al. | |
| 2011/0135996 A1* | 6/2011 | Ahn et al. | 429/162 |
| 2011/0305944 A1* | 12/2011 | Seo | H01M 2/021 |
| | | | 429/179 |
| 2015/0072219 A1 | 3/2015 | Less et al. | |

FOREIGN PATENT DOCUMENTS

| | | |
|---|---|---|
| CN | 101828283 | 9/2010 |
| CN | 102047472 A | 5/2011 |
| CN | 102931370 A | 2/2013 |
| EP | 1 753 056 A1 | 2/2007 |
| JP | 2003-109654 A | 4/2003 |
| JP | 2007-103342 A | 4/2007 |
| JP | 2010-182922 | 8/2010 |
| JP | 2013-033685 A | 2/2013 |
| WO | WO 2009/026467 A1 | 2/2009 |
| WO | WO 2009/043011 A1 | 4/2009 |

OTHER PUBLICATIONS

Chinese Office Action issued May 3, 2016 in Chinese Patent Application No. 201410093092.2 with translation.
Office Action issued in Japanese Patent Application 2013-205792 dated Jan. 31, 2017.
Office Action issued in Chinese Patent Application No. 201410093092.2 dated Jan. 5, 2017.

* cited by examiner

SECONDARY BATTERY

CROSS-REFERENCE TO RELATED APPLICATIONS

This application is based upon and claims the benefit of priority from Japanese Patent Application No. 2013-205792, filed Sep. 30, 2013 the entire contents of which are incorporated herein by reference.

FIELD

Embodiments described herein relate generally to a secondary battery.

BACKGROUND

In a secondary battery such as a lithium secondary battery, a separator is used to avoid contact between the positive electrode and negative electrode. Generally, the separator is prepared as a self-supported film separately from the positive electrode and negative electrode. For example, the separator is sandwiched between the positive electrode and negative electrode to make a unit structure (electrode cell) which is then coiled or laminated to constitute a battery group.

Examples of a general separator include a polyolefin resin film-based microporous film. Such a separator is produced, for example, by extrusion-molding a molten product containing a polyolefin resin composition into a sheet-like form, removing materials except for the polyolefin resin by extraction, and then, stretching the sheet.

A resin film separator needs to have mechanical strength enough to prevent itself from being broken in the production of a battery and it is therefore difficult to reduce its thickness to a certain level or less. In, particularly, a battery of the type in which many electrode cells are laminated or coiled, the number of unit electrode cells which can be accommodated per unit volume of a battery is limited by the thickness of the separator. This leads to a reduction in battery capacity. Also, the resin film separator may be poor in durability. Therefore, when the resin film is used for a secondary battery, this may bring about the disadvantage that the separator is deteriorated during the course of repeated charge/discharge reactions, leading to deteriorated cycle characteristics of the battery.

DETAILED DESCRIPTION

In general, according to one embodiment, there is provided a secondary battery. This secondary battery includes an electrode and an organic-fiber layer. The electrode includes a current collector, an active material-containing layer, and a current-collecting tab. The current collector includes an edge part. The active material-containing layer is supported on at least one surface of the current collector. The current-collecting tab is extended from the edge part of the current collector. The current-collecting tab has a first surface and a second surface. The first surface of the current-collecting tab includes a part adjacent to the edge part of the current collector. The active material-containing layer includes an end part supported on the edge part of the current collector. The end part of the active material-containing layer has a maximum thickness. The organic-fiber layer contains an organic fiber. The organic-fiber layer is bonded with the end part of the active material-containing layer and with the part adjacent to the edge part of the current collector in the first surface of the current-collecting tab.

The organic-fiber layer may serve as a separator between the active material-containing layer of the electrode and the active material-containing layer of a counter electrode.

In the organic-fiber layer, its porosity is increased if the density of the contained fiber is reduced, and it is therefore not difficult to obtain a layer having a porosity of about 90%. When, for example, the secondary battery according to the embodiment is a nonaqueous electrolyte secondary battery in which lithium ions participate, an excellent permeability of lithium ions and a good impregnating ability of nonaqueous electrolyte can be attained by increasing the porosity. On the other hand, it is very difficult to form a layer having a large porosity by using particles.

Also, the organic-fiber layer is more advantageous than an inorganic-fiber layer from the viewpoint of irregularities, fragility, impregnating ability of electrolyte solution, adhesiveness, bending characteristics, porosity, and permeability of ions.

As mentioned above, the organic-fiber layer can attain a more excellent separator function than a separator formed using particles and a separator formed using an inorganic fiber.

The organic-fiber layer is not a self-supporting film, because the organic-fiber layer is bonded with the end part of the active material-containing layer and with the part adjacent to the edge part of the current collector in the first surface of the current-collecting tab. The organic-fiber layer may have a thickness less than 12 μm. The organic-fiber layer having such a reduced thickness can increase the energy density of the secondary battery. On the other hand, a thickness of 12 μm or more is required to constitute a separator by a self-supporting film. Namely, the organic-fiber layer can attain a more excellent separator function than a self-supporting film separator in view of energy density.

The organic-fiber layer may function as a cushion for the end part having a maximum thickness in the active material-containing layer. Thanks to this, although the thickness of the end part of the active material-containing layer is the largest of the active material-containing layer, the development of short circuits between electrodes via this part can be prevented.

In addition, the organic-fiber layer is bonded with a part of the first surface of the current-collecting tab, and this part of the first surface of the current-collecting tab is adjacent to the edge part of the current collector. Therefore, the development of short circuits between electrodes via this part of the first surface of the current-collecting tab can be prevented.

Moreover, the first surface of the current-collecting tab with which the organic-fiber layer is bonded may have a low surface roughness. Here, as the surface roughness, the value measured by any one of arithmetic average roughness (Ra), maximum peak height (Rp), and maximum height roughness (Rz) may be used. The first surface of the current-collecting tab with a low roughness can increase the contact area with the organic-fiber layer to be bonded with the first surface, and can therefore improve the adhesion to the organic-fiber layer. The organic-fiber layer can exhibit a high peeling strength with respect to the electrode by this improvement in adhesion and by modulating the method for forming the organic-fiber layer. The organic-fiber layer having a high peeling strength can stably produce the short-circuit preventive effect explained above for a long period of time.

Then, in the secondary battery according to the embodiment, the organic-fiber layer can have a low density because it contains an organic fiber. These effects contribute to the improvement of the energy density of a secondary battery.

Thus, according to the embodiment, a secondary battery which can be improved in energy density while sufficiently preventing the development of short circuits between electrodes can be provided.

The organic-fiber layer is preferably bonded with both the surface and the end surface of the end part of the active material-containing layer. Such an organic-fiber layer can exhibit a higher peeling strength with respect to the electrode.

The current-collecting tab is more preferably formed from at least one conductive material selected from the group consisting of aluminum, aluminum alloy, and copper. Such a conductive material may have a lower surface roughness. For example, the organic-fiber layer bonded with the surface of the current-collecting tab formed from a conductive material having a low surface roughness can exhibit a peeling strength of 4 N or more with respect to the electrode by modulating the method for forming the organic-fiber layer. The peeling strength with respect to the electrode is more preferably 6 N or more. The peeling strength may be measured by using the measuring instrument (model: RT-2020D-D-CW, manufactured by Rheo-Technology, Ltd.) or an instrument having the same function as the above measuring instrument.

In the secondary battery according to the embodiment, the current collector may include edge parts and the current-collecting tab may be extended from one of the edge parts. Also, both surfaces of the current collector may support the active material-containing layer. Also, the electrode may include an end surface including another edge part of the edge parts of the current collector other than the edge part from which the current-collecting tab is extended. Then, the organic-fiber layer is preferably further bonded with the end surface of the electrode and with a part adjacent to the end surface of the electrode in the active material-containing layer. Such an organic-fiber layer can exhibit a higher peeling strength with respect to the electrode. Also, this organic-fiber layer can prevent the development of short circuits between electrodes via the end surface of the electrode and the part adjacent to the end surface.

Also, in such a secondary battery, the organic-fiber layer is preferably bonded with whole the surface of the active material-containing layer supported on one surface of the current collector, and with the surface of a part adjacent to the end surface of the electrode in the active material-containing layer supported on the other surface of the current collector, and further with the end surface of the electrode. This organic-fiber layer can further prevent the development of short circuits between electrodes.

Next, the secondary battery according to the embodiment will be explained in more detail.

The secondary battery according to the embodiment may be, for example, a nonaqueous electrolyte secondary battery. Alternatively, the secondary battery according to the embodiment may be a secondary battery using an aqueous solution as the electrolyte solution.

The secondary battery according to the embodiment may include an electrode other than the electrode explained above.

The secondary battery according to the embodiment is typically includes one or more negative electrodes and one or more positive electrodes. The electrode explained above is preferably a negative electrode.

The negative electrode may include a negative electrode current collector, a negative electrode active material-containing layer supported on at least one surface of the negative electrode current collector, and a negative electrode current-collecting tab extended from the negative electrode current collector. The negative electrode current-collecting tab may be single-membered with the negative electrode current collector, or be separated from the negative electrode current collector.

As the negative electrode current collector, for example, a metal foil such as an aluminum foil or a copper foil may be used. As the material of the negative electrode current-collecting tab, the same materials as that of the negative electrode current collector may be used.

The negative electrode active material-containing layer may include a negative electrode active material, an optional negative electrode conductive agent, and an optional negative electrode binder.

When the electrode explained above is a negative electrode, the negative electrode active material-containing layer preferably contains lithium titanate.

Lithium titanate can act as the negative electrode active material. Examples of lithium titanate include $Li_{4+x}Ti_5O_{12}$ ($0 \leq x \leq 3$) having a spinel structure and $Li_{2+y}Ti_3O_7$ ($0 \leq y \leq 3$) having a ramsdellite structure.

Such a Lithium titanate can absorb and release lithium ions at a potential of 1.55 V (vs. Li/Li$^+$) or more and therefore, in principle, lithium dendrite does not deposit on the surface of the negative electrode active material-containing layer containing lithium titanate even if the charge-and-discharge reactions are repeated. Also, lithium titanate is almost unchanged in volume associated with a charge-and-discharge reaction. Therefore, the thickness of the organic-fiber layer to be bonded with the surface of the negative electrode active material-containing layer of the negative electrode can be reduced and also the porosity can be increased, with the result that a higher energy density can be attained.

Also, the average primary particle diameter of lithium titanate is preferably in a range from 0.001 to 1 μm. The surface of the negative electrode active material-containing layer containing lithium titanate can exhibit high flatness and therefore can have high adhesiveness to the organic-fiber layer. This can prevent the organic-fiber layer from being peeled from the surface of the negative electrode active material-containing layer.

Examples of other active material which may be contained in the negative electrode active material-containing layer may include carbonaceous materials such as graphite and tin/silicon type alloys.

The particle form of the negative electrode active material may be either a granular form or fiber form. When the particle has a fiber form, the fiber diameter is preferably 0.1 µm or less.

Examples of the negative electrode conductive agent may include acetylene black, carbon black, and graphite. Examples of the binder used to bond the negative electrode active material with the negative electrode conductive agent may include polytetrafluoroethylene (PTFE), polyvinylidene fluoride (PVdF), fluorine-based rubber, and styrene-butadiene rubber.

The positive electrode may include a positive electrode current collector, a positive electrode active material-containing layer supported on at least one surface of the positive electrode current collector, and a positive electrode current-collecting tab extended from the positive electrode current collector. The positive electrode current collecting tab may be single-membered with the positive electrode current collector, or be separated from the positive electrode current collector.

As the positive electrode current collector, a metal foil such as an aluminum foil or a copper foil may be used. As the material of the positive electrode current-collecting tab, the same materials as that of the positive electrode current collector may be used.

The positive electrode active material-containing layer may include a positive electrode active material, an optional positive electrode conductive agent, and an optional positive electrode binder.

For example, usual lithium-transition metal composite oxides may be used as the positive electrode active material. Examples of these lithium-transition metal composite oxides include $LiCoO_2$, $LiNi_{1-x}Co_xO_2$ (0<x<0.3), $LiMn_xNi_yCo_zO_2$ (0<x<0.5, 0<y<0.5, 0≤z≤0.5), $LiMn_{2-x}M_xO_4$ (M represents Li, Mg, Co, Al, or Ni, 0<x<0.2), and $LiMPO_4$ (M represents Fe, Co, or Ni).

Examples of the positive electrode conductive agent may include carbonaceous materials such as acetylene black, carbon black, and graphite. Examples of the binder include polytetrafluoroethylene (PTFE), polyvinylidene fluoride (PVdF), and fluorine-based rubber.

The organic fiber contained in the organic-fiber layer may contain at least one selected from the group consisting of polyamideimide, polyamide, polyolefin, polyether, polyimide, polyketone, polysulfone, cellulose, polyvinyl alcohol (PVA), and polyvinylidene fluoride (PVdF). Examples of polyolefin include polypropylene (PP) and polyethylene (PE). The organic-fiber layer preferably contains an organic fiber containing polyimide. Because polyimide is insoluble and unmeltable even at 250 to 400° C. and is also not decomposed even at 250 to 400° C., an organic-fiber layer superior in heat resistance can be obtained by using polyimide.

The organic fiber preferably has a length of 1 mm or more and a thickness of 1 µm or less. Because the organic-fiber layer containing such an organic fiber can be sufficient in strength, porosity, air permeability, pore diameter, resistance against the electrolyte solution, and oxidation and reduction resistance, it can function as a good separator. The thickness of the organic fiber may be measured by, for example, an electron microscope (SEM) observation, scanning probe type microscope (SPM), transmission electron microscope (TEM), or scanning transmission electron microscope (STEM). Also, the length of the organic fiber is obtained based on the length measured by SEM observation.

When the secondary battery according to the embodiment is a nonaqueous electrolyte secondary battery in which lithium ions participate in charge-and-discharge reactions, 30% or more of the whole volume of the fiber or fibers constituting the organic-fiber layer is preferably occupied by organic fibers or fibers having a thickness of 1 µm or less because it is necessary to secure ion permeability and electrolyte impregnation ability. The thickness of the fiber is more preferably 350 nm or less and even more preferably 50 nm or less. Organic fiber or fibers having a thickness of 1 µm or less, more preferably 350 nm or less, and even more preferably 50 nm or less preferably occupy 80% or more of the whole volume of the fiber or fibers constituting the organic-fiber layer. Also, organic fiber or fibers having a thickness of 40 nm or less more preferably occupy 40% or more of the whole volume of the fiber or fibers constituting the organic-fiber layer. If the diameter of the organic fiber is small, the influence of the organic fiber on the inhibition to the migration of lithium ions can be limited. Such a state can be confirmed by SEM observation of the organic-fiber layer.

The organic-fiber layer preferably has pores and the average pore diameter of these pores is preferably 5 nm to 10 µm. Also, the porosity is preferably 10 to 90%. When the secondary battery according to the embodiment is a battery in which lithium ions pertain in the charge-and-discharge reactions, the organic-fiber layer provided with such pores can reduce the effect of the inhibition to the migration of lithium ions and therefore, the organic-fiber layer has high permeability of lithium ions and also, good impregnation ability of electrolyte solution. The porosity of the organic-fiber layer is preferably 80% or more. The average pore diameter of pores and porosity in the organic-fiber layer may be confirmed by, for example, mercury intrusion, calculation from the volume and the density, SEM observation, or gas absorption/desorption.

The length of the part with which the organic-fiber layer is bonded in the first surface of the current-collecting tab is preferably in a range from 1 mm to 5 mm. When the length of the part with which the organic-fiber layer is bonded in the first surface of the current-collecting tab is in a range from 1 mm to 5 mm, the peeling of the organic-fiber layer from the electrode can be sufficiently prevented and also, the interference of the organic-fiber layer is negligible when the current-collecting tab is connected with other member by, for example, welding. The length, here, is that in the direction in which the current-collecting tab is extended.

When the organic-fiber layer is bonded with whole the surface of the active material-containing layer supported on one surface of the current collector, with the surface of a part adjacent to the end surface of the electrode in the active material-containing layer supported on the other surface of the current collector, and further with the end surface of the electrode, the length of the part with which the organic-fiber layer is bonded after it goes around the end surface of the electrode in the active material-containing layer supported on the other surface of the current collector is preferably 1 mm to 10 mm. In this case, the development of short circuits between electrodes can be sufficiently limited while excess use of the material is restrained. The length, here, means a length in the direction of the extension of the current-collecting tab.

The electrode explained above can form an electrode group in combination with a counter electrode. There is no particular limitation to the structure of the electrode group which the secondary battery according to the embodiment includes. The electrode group may have, for example, a stack structure. The stack structure has a structure in which the positive electrode and the negative electrode are laminated in such a manner that the positive electrode active material-containing layer and the negative electrode active material-containing layer are disposed apart from and opposite to each other. Alternatively, the electrode group may have a coiled structure. The coiled structure is one obtained by spirally winding a laminated body obtained by laminating the electrodes in the above manner. An example of a secondary battery including an electrode group having a stack structure and an example of a secondary battery including an electrode group having a coiled structure will be explained later.

The secondary battery according to the embodiment may contain an inorganic component in the organic-fiber layer. Such an inorganic component can increase the strength of an electrode group including a negative electrode and a positive electrode. The high strength can more improve the thermal shrinkage resistance of the electrode group.

For example, oxides and nitrides may be used as the inorganic component. Examples of the oxide include $Li_2O$, $BeO$, $B_2O_3$, $Na_2O$, $MgO$, $Al_2O_3$, $SiO_2$, $P_2O_5$, $CaO$, $Cr_2O_3$, $Fe_2O_3$, $ZnO$, $ZrO_2$, $TiO_2$, zeolite ($M_{2/n}O \cdot Al_2O_3 \cdot xSiO_2 \cdot yH_2O$ (in the formula, M represents a metal atom such as Na, K, Ca, or, Ba, n denotes the number corresponding to the charge of a metal cation $M^{n+}$, x and y denote molar numbers of $SiO_2$ and $H_2O$ respectively, $2 \leq x \leq 10$, $2 \leq y \leq 160$). The organic-fiber layer containing $\alpha$-$Al_2O_3$ as the inorganic component can exhibit excellent heat resistance.

Examples of the nitride include BN, AlN, $Si_3N_4$, and $Ba_3N_2$.

Further, silicon carbide (SiC), zircon ($ZrSiO_4$), carbonates (for example, $MgCO_3$ and $CaCO_3$), sulfates (for example, $CaSO_4$ and $BaSO_4$), and composite thereof (for example, steatite ($MgO \cdot SiO_2$), forsterite ($2MgO \cdot SiO_2$), and cordierite ($2MgO \cdot 2Al_2O_3 \cdot 5SiO_2$), which are each a kind of ceramics) may be used as the inorganic component.

The shape of the inorganic component is not particularly limited, and the inorganic component may have any one of a spherical form, scaly form, polygonal form, and fibrous form.

Generally, as the inorganic component, one having a high hardness is preferably used. When excess pressure is applied to the organic-fiber layer, there is a fear that pores in the layer are deformed and crushed. When the inorganic component is contained in the organic-fiber layer, the deformation and the like of pores can be avoided due to this inorganic component. Also, deterioration in the durability of a battery can be prevented without deterioration of the electrolyte impregnation ability or that of the ion permeability.

The particle diameter of the inorganic component is preferably 5 nm to 100 µm, more preferably 5 nm to 10 µm, and even more preferably 5 nm to 1 µm in terms of average particle diameter. If the inorganic component having an average particle diameter falling in the above range is contained in an amount less than about 40% based on the total volume of the organic-fiber layer, an intended effect can be obtained. Also, the original effects of the organic-fiber layer are not damaged at all.

The secondary battery according to the embodiment may further include an electrolyte. The above electrode group can be impregnated with the electrolyte.

In the case of a nonaqueous electrolyte battery, a nonaqueous electrolyte is used as the electrolyte. Examples of the nonaqueous electrolyte include liquid nonaqueous electrolytes prepared by dissolving an electrolyte in an organic solvent, and gel-like nonaqueous electrolytes obtained by combining a liquid electrolyte and a high-molecular material. The liquid nonaqueous electrolyte may be prepared by dissolving an electrolyte in an organic solvent in a concentration of 0.5 mol/l to 2.5 mol/l.

Examples of the electrolyte may include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluorometasulfonate ($LiCF_3SO_3$), and bistrifluoromethylsulfonylimitritium [$LiN(CF_3SO_2)_2$] or mixtures of these compounds. Electrolytes which are resistant to oxidation even at a high potential are preferable. Among these compounds, $LiPF_6$ is more preferable.

Examples of the organic solvent include cyclic carbonates such as propylene carbonate (PC), ethylene carbonate (EC), and vinylene carbonate, chain carbonates such as diethyl carbonate (DEC), dimethyl carbonate (DMC), and methylethyl carbonate (MEC), cyclic ethers such as tetrahydrofuran (THF), 2methyltetrahydrofuran (2MeTHF), and dioxolan (DOX), chain ethers such as dimethoxyethane (DME) and diethoethane (DEE), γ-butyrolactone (GBL), acetonitrile (AN), and sulfolane (SL). These organic solvents may be used either singly or in combinations of two or more.

Examples of the high-molecular material may include polyvinylidene fluoride (PVdF), polyacrylonitrile (PAN), and polyethylene oxide (PEO).

As the nonaqueous electrolyte, an ordinary temperature molten salt containing lithium ions (ionic melt), polymer solid electrolyte, inorganic solid electrolyte and the like may be used as the nonaqueous electrolyte.

The secondary battery according to the embodiment may further include a battery container in which the above electrode group and electrolyte are accommodated.

As the battery container, a metal can formed from aluminum, aluminum alloy, iron, or stainless may be used. The plate thickness of the battery can is preferably 0.5 mm or less and more preferably 0.2 mm or less.

Alternatively, as the battery container, a container formed from a laminate film may also be used instead of the metal can. As the laminate film, a multilayer film constituted of a metal foil and a resin film applied to the metal foil is preferably used. As the resin, a polymer such as polypropylene (PP), polyethylene (PE), nylon, or polyethylene terephthalate (PET) may be used. The thickness of the laminate film is preferably 0.2 mm or less.

As the shape of the battery container, various shapes including a square shape, cylinder shape, thin-shape, and coin shape may be used depending on the application of the battery.

The secondary battery according to the embodiment may further include a lead electrically connected with the electrode group. For example, the secondary battery according to the embodiment may include two leads. One of these leads may be electrically connected with the negative electrode current-collecting tab. Another lead may be electrically connected with the positive electrode current-collecting tab.

The material of the lead is not particularly limited. For example, the same material as that of the positive electrode current collector or negative electrode current collector may be used for the lead.

The secondary battery according to the embodiment may further include a terminal which is electrically connected with the lead and is drawn from the battery container. For example, the secondary battery according to this embodiment may include two terminals. One terminal may be connected to the lead electrically connected to the negative electrode current-collecting tab. Another terminal may be connected to the lead electrically connected to the positive electrode current-collecting tab.

The material of the terminal is not particularly limited. For example, the same material as that of the positive electrode current collector or negative electrode current collector may be used for the terminal.

Next, an example of the positional relation between the electrode and organic-fiber layer included in the secondary battery according to the embodiment will be explained with reference to FIG. 1.

Figure 1:
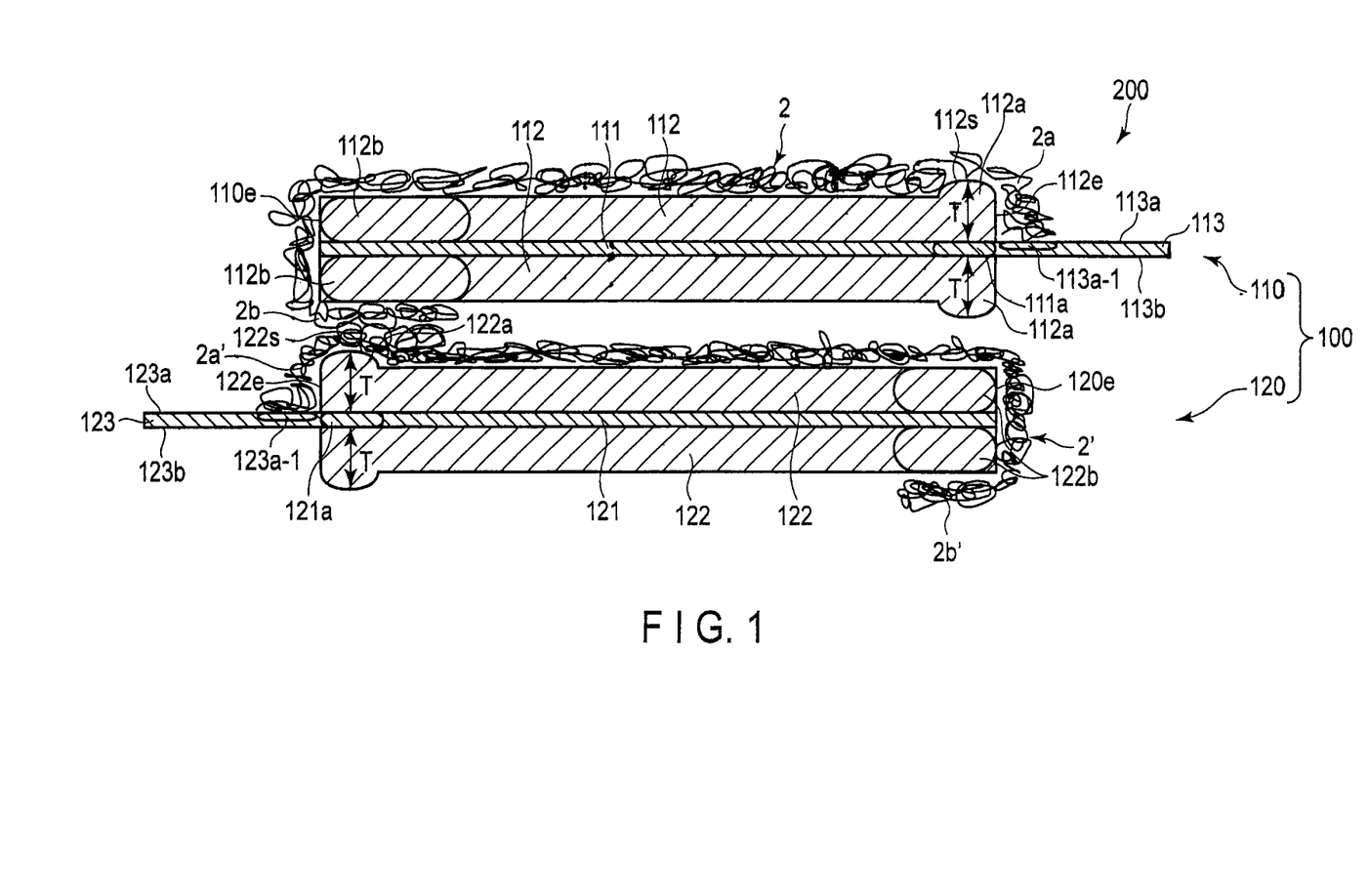
FIG. 1 is a schematic sectional view illustrating an example of the positional relation between an electrode and an organic-fiber layer included in a secondary battery according to an embodiment.

FIG. 1 is a schematic sectional view illustrating an example of the positional relation between an electrode and an organic-fiber layer included in a secondary battery according to the embodiment An electrode group assembly 200 shown in FIG. 1 includes an electrode pair 100 and an organic-fiber layers 2 and 2' bonded with parts of the surface of the electrode pair 100.

The electrode pair 100 includes a first electrode 110 shown above in FIG. 1 and a second electrode 120 shown below in FIG. 1.

The first electrode 110 shown in FIG. 1 is a negative electrode. The negative electrode 110 includes a negative electrode current collector 111, a negative electrode active material-containing layer 112, and a negative electrode current-collecting tab 113.

The negative electrode current collector 111 includes an edge part 111a and the negative electrode current-collecting tab 113 is extended from this edge part 111a. The negative electrode current-collecting tab 113 has a first surface 113a and a second surface 113b. The negative electrode current-collecting tab 113 is single-membered with the negative electrode current collector 111.

Both surfaces of the negative electrode current collector 111A support the negative electrode active material-containing layer 112. The first surface 113a and second surface 113b of the negative electrode current-collecting tab 113 do not support the negative electrode active material-containing layer 112. The negative electrode active material-containing layer 112 has a maximum thickness T, showing a protrusion, at the end part 112a supported on the edge part 111a of the negative electrode current collector 111.

The second electrode 120 shown in FIG. 1 is a positive electrode. The positive electrode 120 is, as shown in FIG. 1, includes a positive electrode current collector 121, a positive electrode active material-containing layer 122, and a positive electrode current collecting tab 123.

The positive electrode current collector 121 includes an edge part 121a and the positive electrode current-collecting tab 123 is extended from this edge part 121a. The positive electrode current-collecting tab 123 has a first surface 123a and a second surface 123b. The positive electrode current-collecting tab 123 is single-membered with the positive electrode current collector 121.

Both surfaces of the positive electrode current collector 121 support the positive electrode active material-containing layer 122. The first surface 123a and second surface 123b of the positive electrode current-collecting tab 123 do not support the positive electrode active material-containing layer 122. The positive electrode active material-containing layer 122 has a maximum thickness T, showing a protrusion, at the end part 122a supported on the edge part 121a of the positive electrode current collector 121.

In the electrode pair 100 shown in FIG. 1, the negative electrode 110 and the positive electrode 120 are arranged in such a manner that one negative electrode active material-containing layer 112 and one positive electrode active material-containing layer 122 are opposed to each other and the positive electrode current-collecting tab 123 and the negative electrode current-collecting tab 113 are extended in a direction opposite to each other.

The organic-fiber layer 2 is, as shown in FIG. 1, is bonded with all of the surface of one negative electrode active material-containing layer 112 which is not opposed to the positive electrode 120, with the end surface 112e of the end part 112a of the one negative electrode active material-containing layer 112, with the end surface 110e of the negative electrode 110 shown on the left in FIG. 1, with a part 112b adjacent to the end surface 110e of the negative electrode 110 in the other negative electrode active material-containing layer 112 which is opposed to the positive electrode 120, and with a part 113a-1 of the first surface of the negative electrode current-collecting tab 113.

Particularly, the organic-fiber layer 2 includes, as a part thereof, a part 2a bonded with both the surface 112s and end surface 112e of the end part 112a of the one negative electrode active material-containing layer 112 and with the part 113a-1 of the first surface of the negative electrode current-collecting tab 113.

Also, the organic-fiber layer 2 further includes, as a part thereof, a part 2b bonded with the part 112b adjacent to the end surface 110e of the negative electrode 110 in the other negative electrode active material-containing layer 112 opposed to the positive electrode 120.

The organic-fiber layer 2' is, as shown in FIG. 1, is bonded with all of the surface of one positive electrode active material-containing layer 122 opposed to the negative electrode 110, with the end surface 122e of the end part 122a of the one positive electrode active material-containing layer 122, with the end surface 120e of the positive electrode 120 shown on the right in FIG. 1, and with the part 122b adjacent to the end surface 120e of the positive electrode 110 in the other positive electrode active material-containing layer 122 which is not opposed to the negative electrode 110. Therefore, the organic-fiber layer 2' is bonded with the part 122b adjacent to the end surface 120e of the positive electrode 120 in the one positive electrode active material-containing layer 122, and with the part 123a-1 of the first surface of the positive electrode current-collecting tab 123.

Particularly, the organic-fiber layer 2' includes, as a part thereof, a part 2a' bonded with both the surface 122s and end surface 122e of the end part 122a of the one positive electrode active material-containing layer 122 and with the part 123a-1 of the first surface of the positive electrode current-collecting tab 123.

Also, the organic-fiber layer 2' further includes, as a part thereof, a part 2b' bonded with the part 122b adjacent to the end surface 120e of the positive electrode 120 in the other positive electrode active material-containing layer 122 which is not opposed to the negative electrode 110.

In an electrode group assembly 200 shown in FIG. 1, the end part 112a of the negative electrode active material-containing layer 112 includes a protrusion. However, in the one negative electrode active material-containing layer 112, the organic-fiber layer 2 is bonded with the surface 112s of the end part 112a. This organic-fiber layer 2 can work as a cushion for the protrusion of the end part 112a of the one negative electrode active material-containing layer 112. Also, with regard to the protrusion of the end part 112a of the other negative electrode active material-containing layer 112, the organic-fiber layer 2' is bonded with the surface of the part adjacent to the end surface 120e of the positive electrode 120 in the positive electrode active material-containing layer 122 opposed to the end part 112a of the other negative electrode active material-containing layer 112, as shown in FIG. 1. Therefore, the part of the organic-fiber layer 2' works as a cushion for the protrusion of the end part 112$a$ of the other negative electrode active material-containing layer 112.

In the electrode group assembly 200 shown in FIG. 1, similarly, the end part 122$a$ of the positive electrode active material-containing layer 122 includes the protrusion as mentioned above. However, the part 2$a'$ of the organic-fiber layer 2' is bonded with the surface 122$s$ of the end part 122$a$ of the one positive electrode active material-containing layer 122 opposed to the negative electrode 110. The part 2$a'$ of the organic-fiber layer 2' can work as a cushion for the protrusion of the end part 122$a$ of the one positive electrode active material-containing layer 122. Moreover, the part 2$b$ of the organic-fiber layer 2 is bonded with the part 112$b$ of the other negative electrode active material-containing layer 112 opposed to the positive electrode 120, and the part 2$b$ of the organic-fiber layer 2 can work as a further cushion for the protrusion of the end part 122$a$ of the other positive electrode active material-containing layer 122.

These advantages ensure that the development of short circuits between the negative electrode 110 and the positive electrode 120 can be prevented in the electrode group assembly 200 shown in FIG. 1.

Also, the organic-fiber layer 2 is bonded with the part 113$a$-1 of the first surface of the negative electrode current collecting-tab 113 and also bonded with the part 112$b$ of the negative electrode active material-containing layer 112 opposed to the positive electrode 120. Therefore, the organic-fiber layer 2 can exhibit a high peeling strength with respect to the negative electrode 110. Similarly, the organic-fiber layer 2' is bonded with the part 123$a$-1 of the first surface of the positive electrode current-collecting tab 123 and also bonded with the part 122$b$ of the positive electrode active material-containing layer 122 which is not opposed to the negative electrode 110. Therefore, the organic-fiber layer 2' can exhibit a high peeling strength with respect to the positive electrode 120.

Moreover, in the electrode group assembly 200 shown in FIG. 1, the organic-fiber layer 2 can prevent the development of short circuits via the end surface 110$e$ of the negative electrode 110 and the organic-fiber layer 2' can prevent the development of short circuits via the end surface 120$e$ of the positive electrode 120.

Next, an example of a method for forming the organic-fiber layer will be explained.

The organic-fiber layer explained above can be easily formed by, for example, an electro-spinning method. By the electro-spinning method, the organic-fiber layer can be obtained in the state where it is bonded with the electrode mentioned above.

In the electro-spinning method, a raw material solution may be ejected from a spinning nozzle over the entire surface of an intended electrode while applying voltage to the spinning nozzle by using a high-voltage generator to thereby form an organic-fiber layer. The voltage to be applied is optionally determined depending on, for example, the types of solvent and solute, boiling point and vapor pressure curve of the solvent, solution concentration, temperature, nozzle shape, and sample-nozzle distance. For example, a difference in potential between the nozzle and work-piece may be designed to be 0.1 to 100 kV. The supply speed of the raw material solution is also determined depending on solution concentration, solution viscosity, temperature, pressure, applied voltage, and nozzle shape. In the case of a syringe type, the supply rate of the raw material solution may be designed to be about 0.1 to 500 µl/min. Also, in the case of a multi-nozzle or slit, the supply rate may be determined depending on the opening area of the supplier.

According to the electro-spinning method, an organic-fiber layer which can exhibit a high peeling strength with respect to the electrode, and specifically, a peeling strength of 4 N or more can be formed from the following reason.

In the electro-spinning method, the raw material solution is charged by the voltage applied to the spinning nozzle, and a solvent is vaporized from the raw material solution, resulting in the increase of charge quantity per volume of the raw material solution. By the vaporization of a solvent followed by the increase in the quantity of charge per unit volume associated with the solvent vaporization, the raw material solution ejected from the spinning nozzle is spread in a longitudinal direction and deposited as a nano-size organic fiber on the electrode. Coulomb's force is generated between the organic fiber and the electrode by a difference in potential between the nozzle and the electrode. Therefore, the contact area with the electrode can be increased by the nano-size organic fibers. Because the organic fibers can be deposited on the electrode by the Coulomb's force, the peeling strength of the organic-fiber layer with respect to the electrode can be increased. In addition, an organic-fiber layer can be formed by bonding the current-collecting tab having a small surface roughness with the organic-fiber layer to obtain the organic-fiber layer exhibiting a higher peeling strength. The peeling strength can be controlled, for example, by controlling the solution concentration and sample-nozzle distance.

Figure 2:
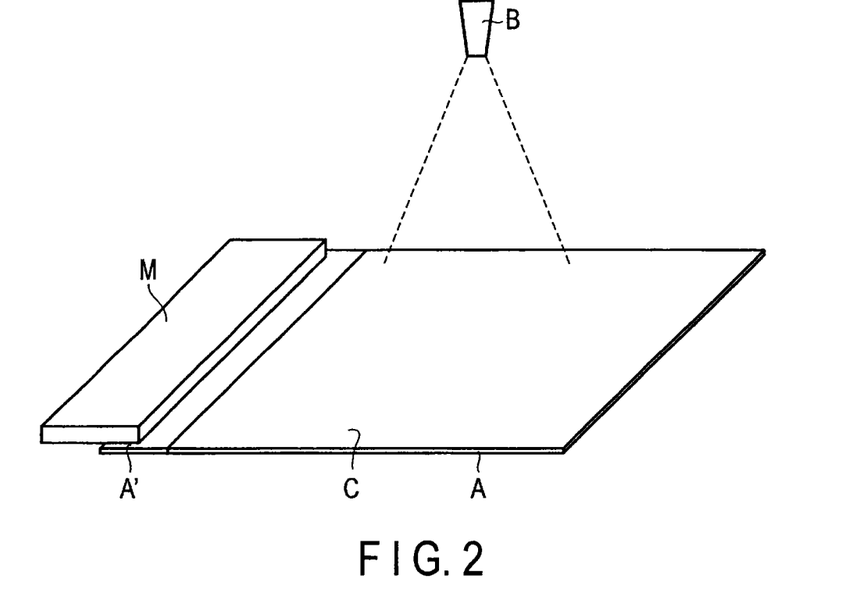
FIG. 2 is a schematic view illustrating an exemplary method for forming an organic-fiber layer.

In the electro-spinning method, as shown in, for example, FIG. 2, a raw material solution is ejected, as mentioned above, from a spinning nozzle B in the situation where a mask M is put on a part A' where any organic fiber is not intentionally deposited among a substrate A on which the organic fiber is to be deposited, thereby enabling an organic-fiber layer C to be formed only on a desired place.

According to such an electro-spinning method, a single and continuous fiber can be formed in principle and therefore, resistance to rupture and film breakage caused by bending can be imparted to the organic-fiber layer. It is advantageous that the organic fiber contained in the organic-fiber layer is constituted of a single fiber, from the viewpoint of low probability of fray and partial defect of the organic-fiber layer and from the viewpoint of limiting self-discharge.

Also, according to this electro-spinning method, an organic-fiber layer is directly formed on the surface of an electrode in a dry state and therefore, the penetration of a solvent into the electrode can be substantially prevented. The amount of a solvent left inside of the electrode becomes as very low as a ppm level or less. The solvent left in the electrode causes an oxidation-reducing reaction, which induces loss of battery capacity, leading to deteriorated battery performance. This electro-spinning method reduces a fear of such a disorder to the utmost and therefore, the performance of a battery can be improved.

The raw material solution used in the electro-spinning method may be prepared by dissolving an organic material in a concentration of, for example, about 5 to 60 mass.

As the organic material, examples given previously as the organic fiber material may be used. Particularly, polyimide and polyvinylidene fluoride (PVdF) have been regarded as materials which are scarcely made into a fibrous form. However, it is found that a fiber containing these materials could be formed into a layer by the electro-spinning method.

The solvent used to dissolve the organic material is not particularly limited. Any solvent such as dimethylacetamide (DMAc), dimethyl sulfoxide (DMSO), N,N'dimethylformamide (DMF), N-methylpyrrolidone (NMP), water, alcohols, or the like may be used. Also, with regard to organic material with less solubility, a sheet-like organic material is electrospun while melting it by a laser. In addition, a mixture of a high-boiling point organic solvent and a low-melting point solvent may be used.

Alternatively, the organic-fiber layer may be formed by an inkjet method, jet dispenser method, or spray-coating method. By these methods, the organic-fiber layer may be obtained in the state where it is bonded to the electrode.

Next, an example of the secondary battery according to the embodiment will be explained with reference to the drawing.

First, a first example of the secondary battery according to the embodiment will be explained with reference to FIG. 3.

Figure 3:
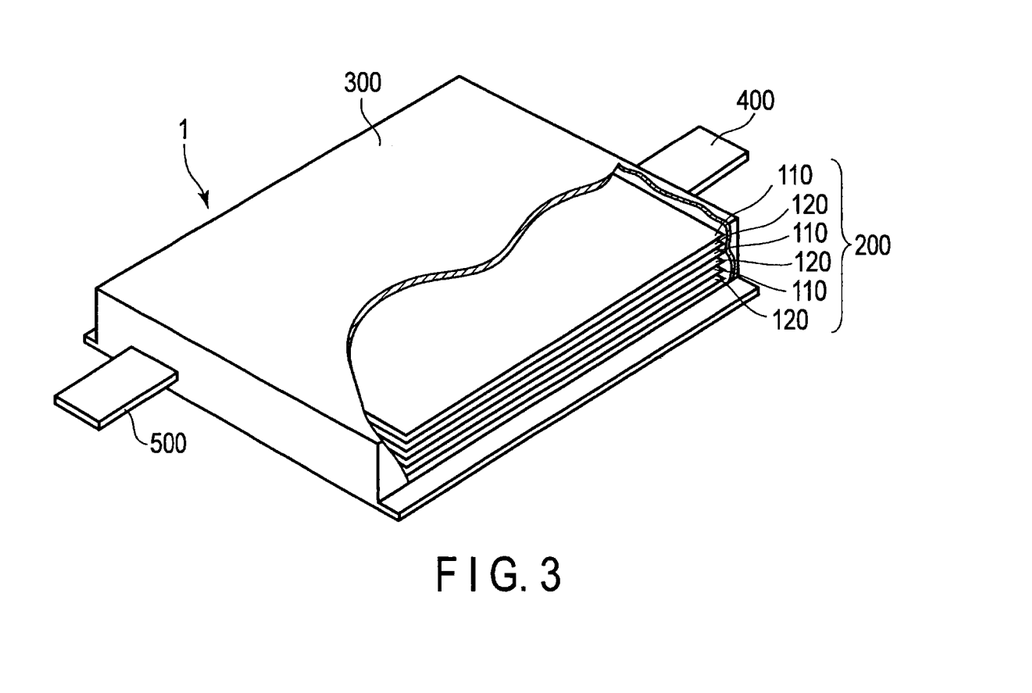
FIG. 3 is a partially broken perspective view of a first example of a secondary battery according to an embodiment.

FIG. 3 is a partially broken perspective view schematically showing the first example of the secondary battery according to the embodiment.

In the first example, a secondary battery 1 is, as shown in FIG. 3, includes an electrode group 200, a container 300, a negative electrode terminal 400, a positive electrode terminal 500, and a nonaqueous electrolyte which is not shown. Namely, the secondary battery 1 of the first example is a nonaqueous electrolyte battery.

As shown in FIG. 3, the electrode group 200 includes three negative electrodes 110 and three positive electrodes 120. These three negative electrodes 110 and three positive electrodes 120 are alternately laminated to form the electrode group 200. Namely, the electrode group 200 shown in FIG. 3 has a stack structure.

One negative electrode 110 and one positive electrode 120 which are opposed to each other constitute the electrode group assembly 100 explained with reference to FIG. 1. The electrode group 200 shown in FIG. 3 includes three assemblies 100 illustrated in FIG. 1.

Though not shown, the negative electrode current-collecting tabs 113 of the three negative electrodes 110 are collected into one current-collecting tab which is connected with the negative electrode terminal 400. Similarly, the positive electrode current collecting tabs 123 of the three positive electrodes 120 are collected into one current-collecting tab which is connected with the positive electrode terminal 500 shown in FIG. 3. Thus, the assembly 100 constituted of the negative electrode 110 and positive electrode 120 shown in FIG. 1 and two further assemblies each having the same structure as the assembly 200 are connected in parallel to each other to form the electrode group 200.

The electrode group 200 as mentioned above is accommodated in a container 300. As shown in FIG. 3, the negative electrode terminal 400 and the positive electrode terminal 500, which are connected to the electrode group 200, are each partly drawn out of the container 300.

A nonaqueous electrolyte which is not shown is further accommodated in the container 300. The electrode group 200 is impregnated with the nonaqueous electrolyte in the container 300.

The secondary battery 1 of the first example shown in FIG. 3 can prevent the development of short circuits between the electrodes from the same reason as that explained with reference to FIG. 1.

Then, the organic-fiber layers 2 and 2' are each capable of exhibiting a high porosity and therefore, the secondary battery 1 of the first example can exhibit a high energy density.

Namely, the secondary battery 1 of the first example can be improved in energy density while sufficiently preventing the development of short circuits between the electrodes.

Next, a secondary battery of a second example will be explained with reference to FIG. 4.

Figure 4:
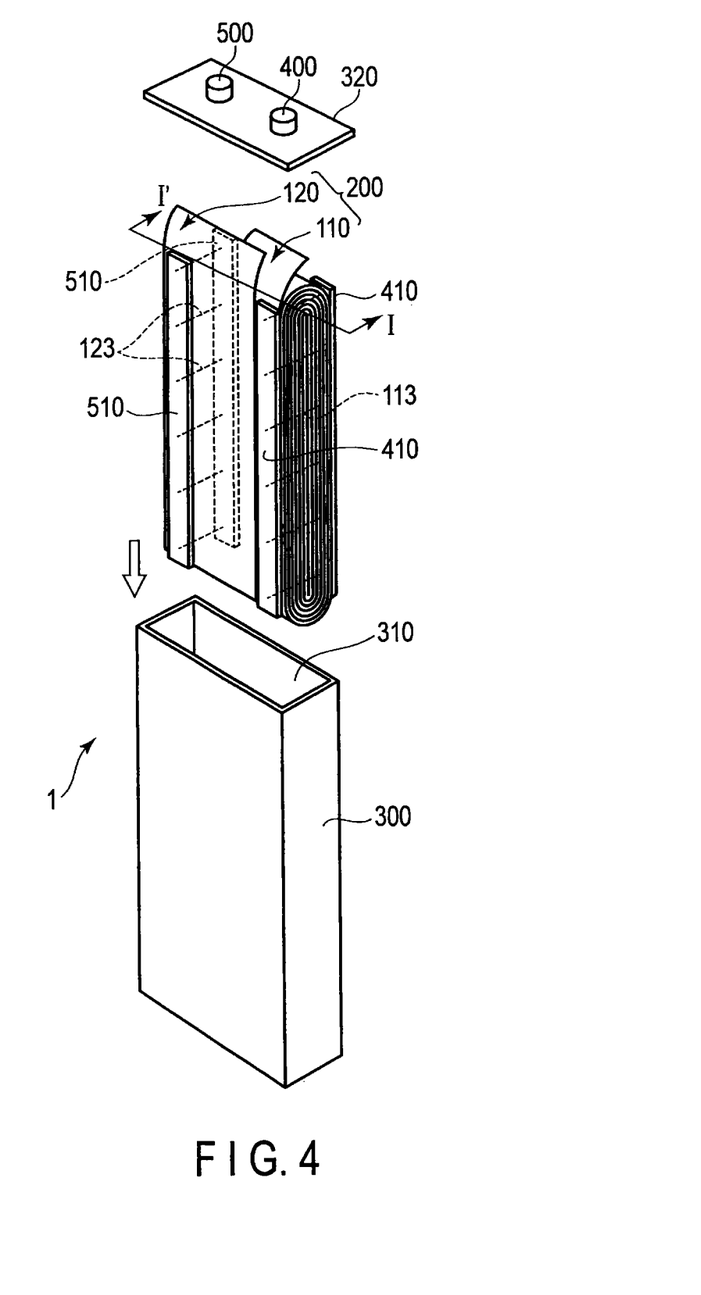
FIG. 4 is an exploded perspective view schematically illustrating a second example of a secondary battery according to an embodiment.

FIG. 4 is an exploded perspective view schematically illustrating the second example of the secondary battery according to the embodiment.

The secondary battery 1 of an example 2 is, as shown in FIG. 4, includes an electrode group 200, a container 300, a negative electrode terminal 400, a positive electrode terminal 500, and a nonaqueous electrolyte which is not shown. Namely, the secondary battery 1 of the second example is a nonaqueous electrolyte battery.

As shown in FIG. 4, the electrode group 200 includes one negative electrode 110 and one positive electrode 120. The negative electrode 110 and the positive electrode 120 constitute the electrode group assembly 100 explained with reference to FIG. 1. The electrode group 200 shown in FIG. 4 corresponds to this electrode group assembly 100.

As shown in FIG. 4, one negative electrode 110 and one positive electrode 120 are laminated and coiled such that the positive electrode 120 is disposed on the outermost surface. Namely, the electrode group 200 shown in FIG. 4 has a coiled structure. In the coiled-type electrode group 200, the negative electrode current-collecting tab 113 and the positive electrode current-collecting tab 123 are extended in directions opposite to each other as shown in FIG. 4.

As shown in FIG. 4, the negative electrode current-collecting tab 113 is sandwiched between two negative electrode current-collecting plates 410. Similarly, the positive electrode current-collecting tab 123 is sandwiched between two positive electrode current-collecting plates 510.

As shown in FIG. 4, the electrode group 200 is accommodated in the container 300 having an opening part 310. In FIG. 4 illustrating a exploded view, the opening part 310 is sealed with a sealing plate 320. The sealing plate 320 includes the negative electrode terminal 400 and positive electrode terminal 500. The negative electrode terminal 400 is electrically connected to the negative electrode current-collecting plate 410. Similarly, the positive electrode terminal 500 is electrically connected to the positive electrode current-collecting plate 510.

In the secondary battery 1 of the second example, the development of short circuits between the electrodes can be prevented from the same reason as that explained with reference to FIG. 1. Particularly, in the formation of the coiled-type electrode group, large stress is applied to a place close to the protrusion which may exist at the end part of the active material-containing layer, and there is therefore a fear concerning the development of short circuits between the electrodes. However, in the secondary battery 1 of the second example, the part 2b of the organic-fiber layer 2 can work as a further cushion for the protrusion at the end part 122a of the one positive electrode active material-containing layer 122 and also, the part 2b' of the organic-fiber layer 2' can work as a further cushion for the protrusion at the end part 112a of the one negative electrode active material-containing layer 112, thereby making it possible to further prevent the development of short circuits between the electrodes in the formation of the coiled-type electrode group 200.

Then, since the organic-fiber layers 2 and 2' each can exhibit a high porosity, the secondary battery 1 of the second example can exhibit a high energy density.

Namely, the secondary battery 1 of the second example can improve energy density while sufficiently preventing the development of short circuits between the electrodes.

In the secondary battery of the embodiment as explained above, the organic-fiber layer is bonded with the end part having a maximum thickness in the active material-containing layer and a part adjacent to that part in the surface of the current-collecting tab, and therefore, the development of short circuits caused by these parts can be prevented. Also, the energy density can be improved thanks to the provision of the organic-fiber layer.

EXAMPLES

Examples will be explained below. In the following examples, the length is one in the direction in which the negative electrode current-collecting tab 213 and positive electrode current-collecting tab 223 shown in FIG. 1 are extended.

Example 1

In Example 1, 50 of the same batteries as the secondary battery 1 shown in FIG. 4 were produced.

As a negative electrode 110, an electrode obtained by forming a negative electrode active material-containing layer 112 containing lithium titanate on a negative electrode current collector 111 made of an aluminum foil was prepared. The average primary particle diameter of lithium titanate was 0.5 μm. The surface roughness of the negative electrode current-collecting tab 113 of the produced negative electrode 110 was as follows: Ra: 0.31 μm and Rz: 3.34 μm. Also, the surface roughness of the negative electrode active material-containing layer 112 was as follows: Ra: 1.23 μm and Rz: 15.74 μm.

As a positive electrode 120, an electrode obtained by forming a positive electrode active material-containing layer 122 containing lithium cobaltate on a positive electrode current collector 121 made of an aluminum foil was prepared.

In this example, the length of the negative electrode current-collecting tab 113 was 10 mm and the length of the positive electrode current-collecting tab 123 was 10 mm.

The organic-fiber layers 2 and 2' were formed on this negative electrode 110 and positive electrode 120 by an electro-spinning method for which an example was shown in FIG. 2. PVdF was used as the organic material. This PVdF was dissolved in DMAc used as a solvent in a concentration of 20% by mass to prepare a raw material solution used to form the organic-fiber layers 2 and 2'. The obtained raw material solution was supplied to the surface of the negative electrode from a spinning nozzle at a supply rate of 5 μl/min by using a metering pump. The organic-fiber layers 2 and 2' were formed while a voltage of 20 kV was applied to the spinning nozzle by using a high-voltage generator and moving only one spinning nozzle was moved in a range of 100×200 mm. Thus, an electrode group assembly 100 including the negative electrode 110, positive electrode 120, and organic-fiber layers 2 and 2' was produced.

In this example, the length of the part, which is bonded to the part 113*a*-1 of the first surface of the negative electrode current-collecting tab 113, of the organic-fiber layer 2 was designed to be 5 mm. Also, the length of the part, which is bonded to the part 123*a*-1 of the first surface of the positive electrode current-collecting tab 123, of the organic-fiber layer 2' was likewise designed to be 5 mm.

Also, in this example, in the organic-fiber layer 2, the length of the part 2*b* bonded with the part 112*b* of the surface of the negative electrode active material-containing layer 112 opposed to the positive electrode 120 was designed to be 0.5 mm.

The electrode group assembly 100 thus produced, of which the sectional structure was shown in FIG. 1, was coiled such that the positive electrode 120 was disposed outside to produce the electrode group 200.

On the other hand, $LiPF_6$ was dissolved in a nonaqueous solvent obtained by mixing ethylene carbonate (EC) with dimethyl carbonate (DMC) to prepare a nonaqueous electrolyte.

The electrode group 200 was accommodated together with this nonaqueous electrolyte in the battery container 300 to manufacture a secondary battery 1 of Example 1.

<Short Circuit Test>

50 secondary batteries 1 thus obtained were subjected to a short circuit test.

As a result, a short circuit was confirmed in 45 secondary batteries 1 among the manufactured 50 secondary batteries.

<Observation of Organic-Fiber Layers 2 and 2' by SEM and Mercury Intrusion Method>

As a result of observation using SEM, it was confirmed that each thickness of the organic-fiber layers 2 and 2' of the secondary battery 1 of Example 1 was 20 μm and the thickness of the organic-fiber contained in these organic-fiber layers 2 and 2' was 400 nm or less. It was also confirmed that the porosity was 85% or more by the mercury intrusion method.

<Measurement of Peeling Strength of Organic-Fiber Layers 2 and 2'>

The peeling strength of the organic-fiber layer 2 with respect to the negative electrode 110 in the electrode group 200 of the secondary battery 1 was measured. The peeling strength was measured by the measuring instrument (model: RT-2020D-D-CW, manufactured by Leotech Company). The peeling strength of the organic-fiber layer 2 of the secondary battery 1 in Example 1 from the negative electrode 110 was 4 N.

Example 2

In this example, 50 secondary batteries 1 were manufactured in the same manner as in Example 1 except that in the organic-fiber layer 2, the length of the part 2*b* bonded with the part 112*b* of the surface of the negative electrode active material-containing layer 112 opposed to the positive electrode 120 was altered to 1 mm.

A short circuit test of the manufactured 50 secondary batteries 1 was made, to confirm that 25 secondary batteries 1 developed a short circuit.

Comparative Example

In this comparative example, 50 secondary batteries 1 were manufactured in the same manner as in Example 1 except that the organic-fiber layer 2 was not bonded with the part 113*a*-1 of the first surface of the negative electrode current-collecting tab 113 and the organic-fiber layer 2' was not bonded with the part 123*a*-1 of the first surface of the positive electrode current-collecting tab 123.

A short circuit test of the manufactured 50 secondary batteries 1 was made, to confirm that all of the 50 secondary batteries 1 developed a short circuit.

<Results>

It is found that the development of short circuits between the electrodes caused by the coiling operation could be more limited in Examples 1 and 2 than in Comparative Example.

It is also found that the development of short circuits between the electrodes caused by the coiling operation could be more limited in Example 2 than in Example 1. It is considered that this is because the part 2b of the organic-fiber layer 2 could work as a further cushion for the protrusion at the end part 122a of the one positive electrode active material-containing layer 122 and also, the part 2b' of the organic-fiber layer 2' could work as a further cushion for the protrusion at the end part 112a of the one negative electrode active material-containing layer 112.

The secondary batteries 1 of Comparative Example were each disassembled to confirm that the organic-fiber layer 2 was peeled from the negative electrode 110 in all of the batteries 1. It is considered that this is the main reason of short circuits. Also, the contact between the end surface 110e of the negative electrode 110 and the part 123a-1 of the first surface of the positive electrode current-collecting tab 123 was caused by coiling shift. This is also considered to be the reason why short circuit was developed.

According to the secondary battery of at least one of embodiments and examples, the organic-fiber layer is bonded with the end part having the maximum thickness in the active material-containing layer and with the part adjacent to that part in the surface of the current-collecting tab, and therefore, the development of short circuits caused by this part can be prevented. Also, since the organic-fiber layer is provided, energy density can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
an electrode pair comprising a first electrode and a second electrode, at least one of which comprising:
a current collector comprising an edge part,
an active material-containing layer supported on at least one surface of the current collector, an end part of the active material-containing layer being supported on the edge part of the current collector, the end part of the active material-containing layer comprising a protrusion protruding away from the current collector, and
a current-collecting tab extended from the edge part of the current collector and comprising a first surface and a second surface, the first surface comprising a part adjacent to the edge part of the current collector; and
an organic-fiber layer comprising organic fibers and directly formed on a surface of the protrusion of the end part of the active material-containing layer, on an end surface of the end part of the active material-containing layer, and on the part adjacent to the edge part of the current collector,
the organic-fiber layer being directly formed by ejecting a raw material solution to the surface of the protrusion of the end part of the active material-containing layer, to the end surface of the end part of the active material-containing layer, and to the part adjacent to the edge part of the current collector, and
the organic fibers are continuously spread in a longitudinal direction of the at least one electrode.

2. The secondary battery according to claim 1, wherein the current-collecting tab is formed from at least one conductive material selected from the group consisting of aluminum, aluminum alloy, and copper.

3. The secondary battery according to claim 1, wherein a peeling strength of the organic-fiber layer with respect to the at least one electrode is 4 N or more.

4. The secondary battery according to claim 1, wherein
the current collector comprises edge parts, one of the edge parts being the edge part from which the current-collecting tab is extended;
the current collector comprises two surfaces, and both the two surfaces of the current collector support the active material-containing layer;
the at least one electrode comprises an end surface comprising another edge part of the current collector other than the edge part from which the current-collecting tab is extended;
the active material-containing layer comprises a part adjacent to the end surface of the at least one electrode; and
the organic-fiber layer is further directly formed on the end surface of the at least one electrode and on the part adjacent to the end surface of the at least one electrode in the active material-containing layer.

5. The secondary battery according to claim 4, wherein the organic-fiber layer is directly formed on the whole surface of the active material-containing layer supported on one surface of the current collector, on a surface of the part adjacent to the end surface of the at least one electrode in the active material-containing layer supported on the other surface of the current collector, and on the end surface of the at least one electrode.

6. The secondary battery according to claim 1, wherein the active material-containing layer comprises lithium titanate.

7. The secondary battery according to claim 6, wherein the lithium titanate has an average primary particle diameter ranging from 0.001 to 1 µm.

8. The secondary battery according to claim 5, wherein
the first electrode comprises the current collector, the active material-containing layer, and the current-collecting tab;
the second electrode comprises
a current collector comprising an edge part,
an active material-containing layer supported on at least one surface of the current collector of the second electrode, an end part of the active material containing-layer of the second electrode being supported on the edge part of the current collector of the second electrode, the end part of the active material-containing layer of the second electrode comprising a protrusion protruding away from the current collector of the second electrode, and
a current-collecting tab extended from the edge part of the current collector of the second electrode and comprising a first surface and a second surface, the first surface of the current-collecting tab of the second electrode comprising a part adjacent to the edge part of the current collector of the second electrode;

the active material-containing layer of the first electrode and the active material-containing layer of the second electrode are opposed to each other, and the current-collecting tab of the first electrode and the current-collecting tab of the second electrode are extended in directions opposite to each other;

the organic-fiber layer comprises a first organic-fiber layer and a second organic-fiber layer;

one part of the first organic-fiber layer is directly formed on a part of the active material-containing layer of the first electrode, the part of the active material-containing layer of the first electrode being opposite to a surface of the protrusion of the end part of the active material-containing layer of the second electrode;

the other part of the first organic-fiber layer is directly formed on the surface of the protrusion of the end part of the active material-containing layer of the first electrode, on the end surface of the end part of the active material-containing layer of the first electrode, and on the part of the first surface of the current-collecting tab of the first electrode, which is adjacent to the edge part of the current collector;

one part of the second organic-fiber layer is directly formed on the surface of the protrusion of the end part of the active material-containing layer of the second electrode and on the end s face of the end part of the active material-containing layer of the second electrode;

the other part of the second organic-fiber layer is directly formed on the part of the first surface of the current-collecting tab of the second electrode, which is adjacent to the edge part of the current collector; and the one part of the first organic-fiber layer is opposed to the one part of the second organic-fiber layer.

\* \* \* \* \*